Jan. 6, 1942.  W. D. WINDERS  2,269,067
RECORD KEEPING APPARATUS
Filed July 20, 1939  3 Sheets-Sheet 2
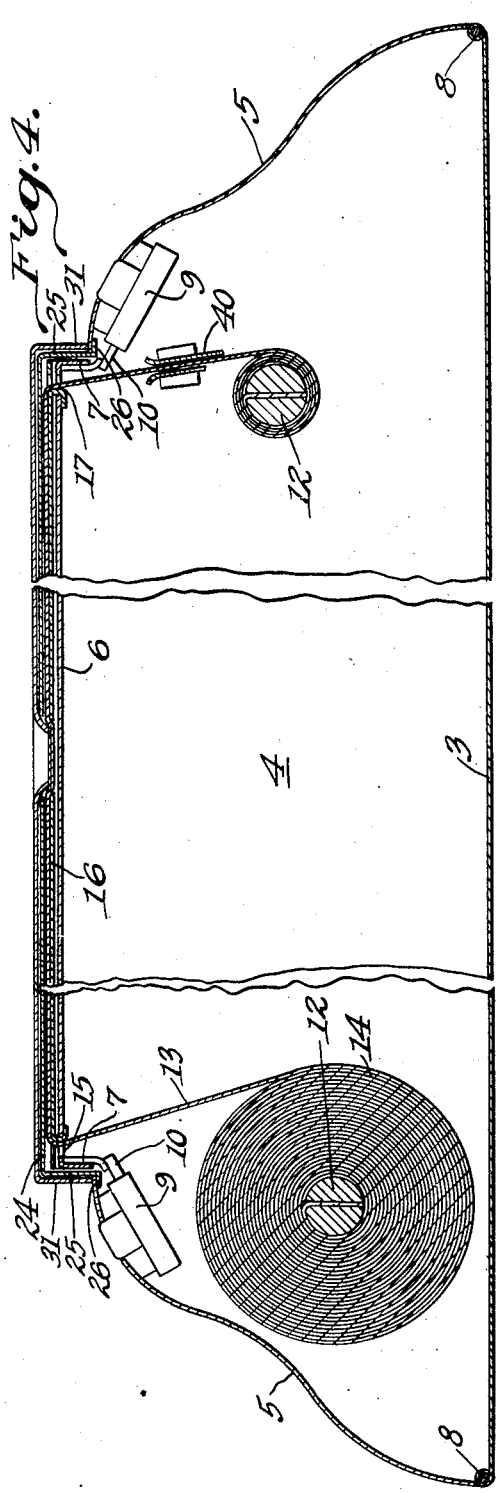
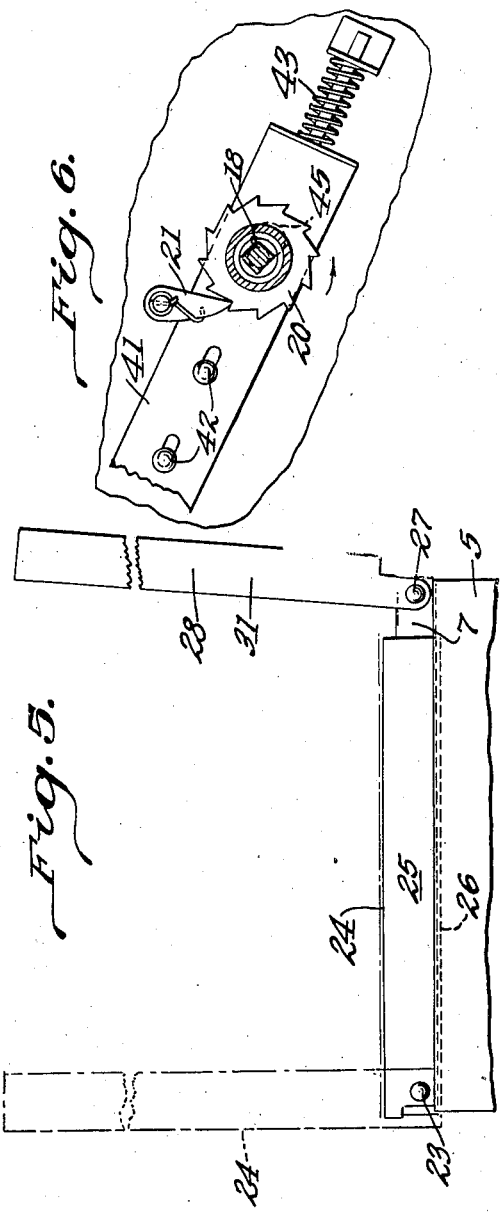
Inventor
William Dale Winders
By W. S. McDowell
Attorney Jan. 6, 1942.  W. D. WINDERS  2,269,067
RECORD KEEPING APPARATUS
Filed July 20, 1939  3 Sheets-Sheet 3

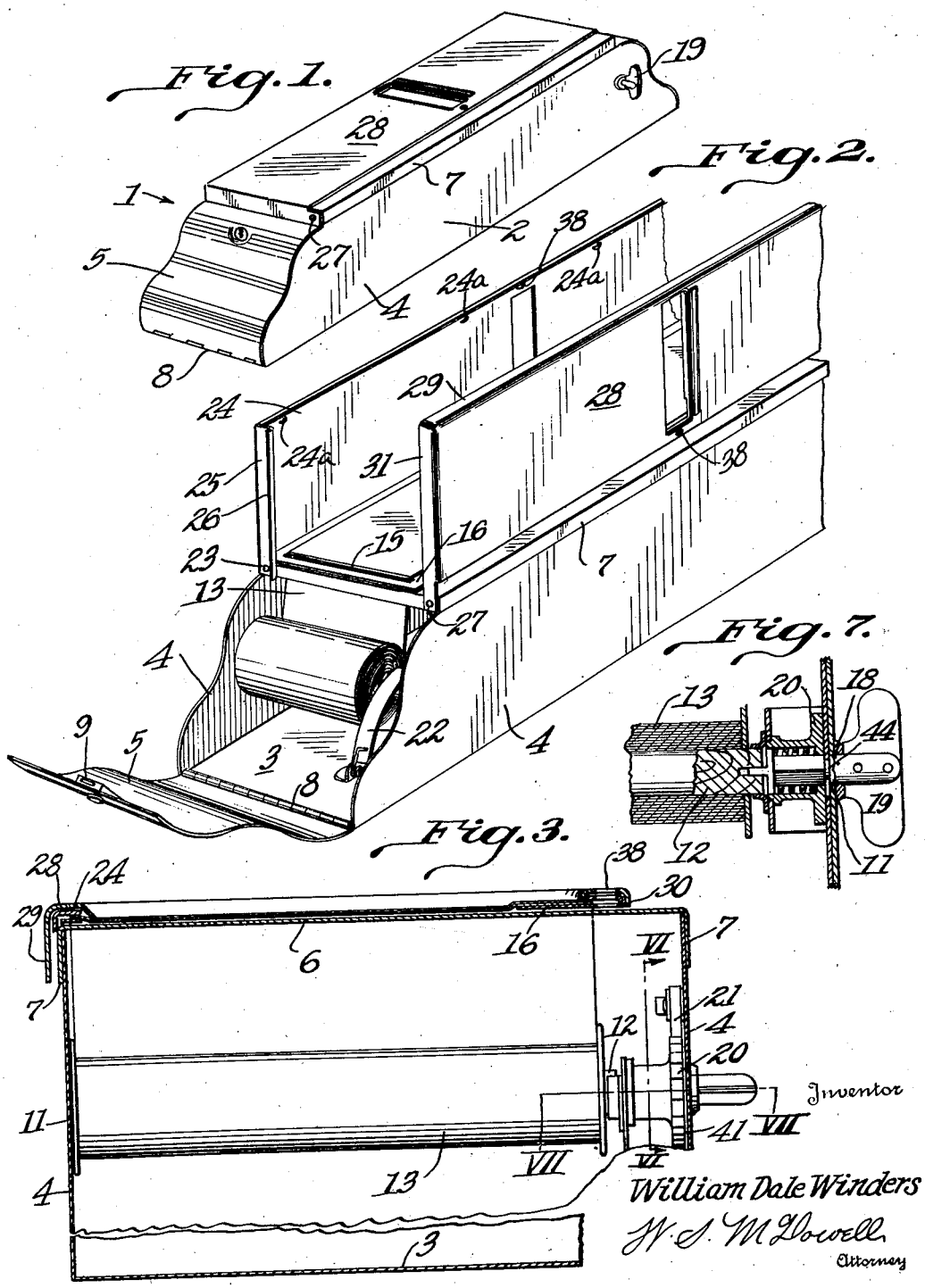

Inventor
William Dale Winders
By W. S. McDowell
Attorney

Patented Jan. 6, 1942

2,269,067

UNITED STATES PATENT OFFICE 2,269,067

RECORD KEEPING APPARATUS

William Dale Winders, Columbus, Ohio

Application July 20, 1939, Serial No. 285,562

15 Claims. (Cl. 282—5)

This invention relates to record keeping apparatus and is particularly directed to apparatus for use by small banks, finance companies and commercial establishments which sell merchandise on credit and receive payment therefor on an installment basis. In such transactions, the purchaser is usually provided with an account book or sheet and when payments are made, the cashier receiving them enters the amount in the purchaser's account book and on a ledger card forming a part of the merchant's records. This system, as presently practiced, is objectionable in that it requires the cashier to make two separate entries with the consequent possibility of error, a useless expenditure of time and effort and the opportunity of the person receiving the payments to purposely make incorrect entries with the view of cheating his employer.

The primary object of the invention resides in the provision of mechanism which will avoid the above objections by requiring the cashier to make but one entry which will appear on the customer's record as well as the merchant's ledger card and on a sheet maintained under lock and key to which only the proper authority may have access.

Another object resides in providing a record keeping apparatus in which the customer's record sheet or passbook and the ledger card may be positioned in superposed order with one or more sheets of carbon copy paper therebetween, the apparatus being so formed that the card and pass book may be adjusted with respect to one another to secure the proper registration of the lines on each to receive the entry.

Another object in the formation of the apparatus is the provision of a supplemental record for individual use by the proprietor or other authorized officer. This record is secured through the use of a plurality of strips of carbon paper, one of which receives an impression of all transactions made on the apparatus, the strips being maintained under lock and key to prevent unauthorized access thereto.

A still further object resides in the provision of a box-like member having means for movably supporting a strip of carbon paper and means to hold the paper in spaced relation from a ledger card removably positioned in the apparatus, the member also being provided with a pair of hinged plates to permit the insertion of the carbon paper strips and protect them after their insertion, one of the hinged plates permitting the insertion of a customer's passbook into the apparatus for registration with the ledger card, the hinged plates and carbon paper spacing member being formed with registering openings to permit an entry to be made in the passbook and impressed by means of the carbon paper onto the ledger card.

Other objects will become apparent from the following description of the preferred form of the invention which has been illustrated in detail in the accompanying drawings.

Fig. 1 is a perspective view of a record keeping apparatus formed in accordance with the present invention;

Fig. 2 is a similar view on an enlarged scale showing various movable portions of the apparatus in position to permit the insertion of the roll of carbon paper;

Fig. 3 is a vertical transverse sectional view taken through the apparatus shown in Fig. 1;

Fig. 4 is a vertical longitudinal sectional view taken through the apparatus;

Fig. 5 is an end view of the upper portion of the device showing the pivotal mounting for various parts thereof;

Fig. 6 is a detail vertical sectional view taken on the plane indicated by the line VI—VI of Fig. 3;

Fig. 7 is a detail horizontal sectional view taken on the plane indicated by the line VII—VII of Fig. 3;

Figure 8:
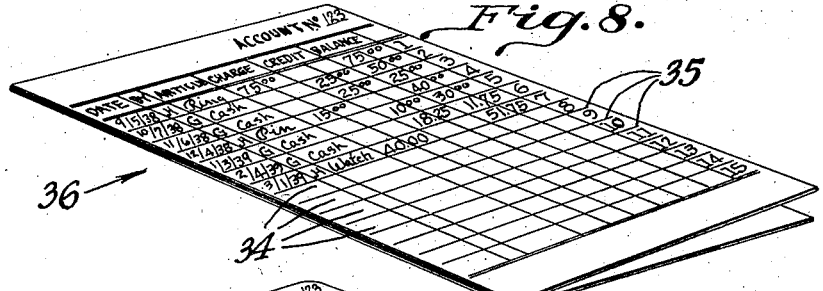
Fig. 8 is a perspective view of a customer's account sheet.

Referring more particularly to the drawings, the numeral 1 designates the record keeping apparatus in its entirety. While the external configuration of the device may be varied in a vast number of ways, of which the present showing is one example, the apparatus includes a support 2 which in this instance comprises a box-like casing having bottom and side walls 3 and 4, hinged end walls 5 and a panel-like top wall 6. The latter wall is formed with a downwardly directed peripheral flange 7 which serves to strengthen the wall and render it more rigid. The flange also provides convenient means for securing the wall 6 to the side walls of the support box 2.

The end walls 5 are hinged at their lower edges as at 8 to the end edges of the bottom wall 3 and may be swung to an open position, as shown in Fig. 2, to permit ready access to the interior of the casing. Unauthorized access to the casing is precluded by providing the end walls with suitable locks 9 having movable members 10 which cooperate with the top wall or other section of the box to secure the hinged walls in closed positions. The locks may be operated to release the hinged closures only through the use of a proper key in the possession of the merchant or his duly authorized agent.

Within the casing, the side walls are provided adjacent each end with bearing means 11 to rotatably support spool-like receivers 12 on which elongated strips of carbon or other copy paper 13 may be wound. When the end walls are in an open position, the spool members 12 may be removed or replaced very readily. Prior to using the apparatus, a fresh roll 14 of carbon paper 13 is positioned in the bearings at the front end and an empty spool in the bearings at the opposite end of the casing. The free end of the paper strip is then passed upwardly through a slot 15 formed at the forward end of the panel 6 and longitudinally of the device over a separator plate 16 secured to the device in spaced superposed relation to the panel. At the rear end of the apparatus, the paper strip is returned to the box through a second slot 17 and connected with the empty spool at the rear end of the casing. The slots 15 and 17 are made smooth to prevent injury to the paper by bending a portion of the plate through the slots formed in the panel.

In axial registration with the last-mentioned spool, the casing side wall is provided with a stub shaft 18 which is separably coupled to the spool in order that turning movement will be imparted to the latter in response to rotation of the shaft through manipulation of the handle 19 connected with its outer end. The stub shaft also has a ratchet wheel 20 connected thereto within the interior of the casing, a pivoted spring pressed dog 21 cooperating with the ratchet to prevent reverse rotation of the spool. To maintain the carbon strips under a slight tension to prevent wrinkling or buckling thereof, the casing has a friction member 22 positioned therein to yieldably engage the spool at the front of the apparatus and resist turning movement thereof. In the present instance, the roll 14 is composed of two strips of carbon paper which have the carbon treated surfaces turned downward while passing over the separator plate 16. The purpose of the double carbon strip in the arrangement above described will be hereinafter set forth.

Secured to the apparatus by studs 23 is a protector plate 24 which is arranged to extend over and completely cover the portion of the carbon paper strips passing over the separator plate 16. The studs connect the protector plate with the flange at the ends of the panel 6 adjacent one of the longitudinal side edges and provide for pivotal movement of the plate 24 around the axis formed by the studs. When the plate 24 is in an elevated or open position as shown in Fig. 2 and by dotted lines in Fig. 5, the carbon paper strips 13 may be trained through the device as previously described. After the carbon paper has thus been inserted, the plate 24 is swung to a closed position to prevent access thereto.

The plate 24 is maintained in position to protect the carbon paper by forming downwardly and laterally directed flanges 25 on the ends of the plate. The lateral extensions 26 on the flanges 25 extend under the upper edges of the hinged ends 5 and prevent pivotal movement of the plate 24 when the ends are closed. Narrow flanges are also formed on the longitudinal edges of the protector plate to prevent the insertion of paper or other foreign material between the carbon papers. When the protector plate is in its lowered position, the carbon paper is entirely enclosed and protected against being mutilated or having anything written thereon altered.

A second set of studs 27 pivotally secure a cover member 28 to the device. This member also has downwardly directed flanges 29, 30 and 31 at its side and end edges, the studs 27 extending through the latter flanges and securing the cover to the end flanges of the panel adjacent the longitudinal edge opposite that near which the protector plate is connected. The cover member may be swung on its pivot studs from a position overlying the protector plate, as shown in Figs. 1 and 3, to an elevated position exposing said plate, as shown in Figs. 2 and 5. When in the latter position, the protector plate may be freely opened or closed since the arrangement of the pivot studs for the cover causes it to move entirely away from the protector plate.

Figure 9:
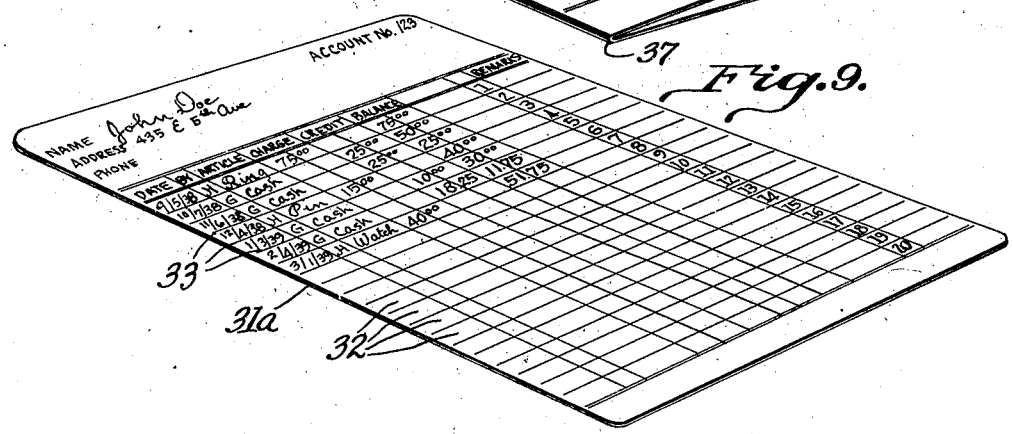
Fig. 9 is a similar view of the merchant's or other creditor's ledger card.
Figure 10:
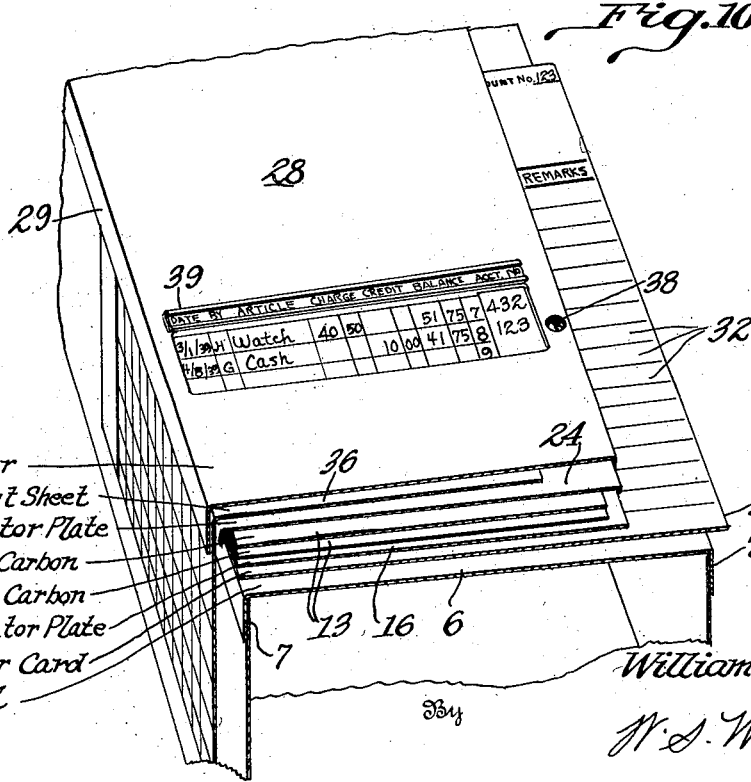
Fig. 10 is a perspective view of the apparatus with a customer's account sheet and a ledger card operatively positioned therein, an entry having just been completed.

As shown particularly in Fig. 3, the width of the cover, protector and separator plates is less than that of the panel in order to expose a portion of the latter when all the parts are operatively positioned. The flange 30 along the edge of the cover adjacent the exposed strip of the panel is considerably shorter than the flange 29 at the opposite edge. The short flange 30 terminates in slightly spaced relationship from the top surface of the panel to permit a ledger card 31a of the type illustrated in Fig. 9 to be inserted between the separator plate and the panel as shown in Fig. 10. As the apparatus is greater in length than the card, the latter may be adjusted to secure the registration of any of the writing spaces 32 formed by lines 33 thereon with registering transversely extending slots formed in the cover member and the protector and separator plates. The spaces 32 correspond with similar spaces 34 formed by transverse lines 35 provided on a customer's account sheet 36 of the type illustrated in Fig. 8.

The account sheet is folded as at 37 to provide a pair of leaf sections, one of which is placed beneath the cover 28 on the protector plate with the other leaf section extending downward at the left side of the casing as illustrated in Fig. 10. When the cover is lowered to its normal position, the writing spaces 34 of the sheet 36 will be visible through the slot in the cover. The latter member does not bear directly on the protector plate but is spaced slightly therefrom to permit the account sheet to be adjusted longitudinally of the apparatus in order to secure registration of the proper writing space with the slot in the cover. The fold in the account sheet coincides with the longitudinal edge of the protector plate and serves to properly locate the account sheet laterally with respect to the apparatus.

The account sheets and ledger cards are also provided with longitudinally extending lines to divide the writing spaces into a plurality of columns which are identified by suitable indicia printed at the heads thereof, the position of like columns on the sheets and cards being identical so that they may register with one another when the cards and sheets are operatively disposed in the apparatus. To further secure the registration of the spaces in which the entry is to be made, the cover and other plates are formed with a sight opening 38 at the end of the writing slots through which space numbers printed on the ledger card may be observed.

In the particular account sheet and ledger card illustrated, the latter has a greater number of writing spaces than the former and, by reason of this, entries might be made on the account sheets in spaces bearing different numbers than the spaces on the ledger card which will receive the same entries. By observing the number of the first empty writing space on the ledger card, the operator may secure the registration of that space with the writing opening by moving the ledger card in its pocket until the number may be viewed through the opening 38. Then, when the account card is inserted in the apparatus, the first blank writing space thereon may be disposed in lateral registration with the opening 38 and the spaces on the ledger card and account sheet to receive the entry will be in proper vertical registration.

As shown in Fig. 3, the writing openings in the cover and protector plate are slightly longer than the one on the separator plate, the length of the latter corresponding substantially with the width of the account sheet. The difference in length of the slots is provided to permit the operator to make a notation directly on the carbon paper at the side edge of the account sheet without having this notation transferred through to the ledger card as those made on the account sheet will be. Attention is called to the fact that the customer's account sheet is given a number which corresponds to the ledger card kept by the merchant. When the operator makes an entry with this apparatus, he or she, as the case may be, is required to write the number of the account in which the transaction is made on the carbon paper to provide a more complete record. The ledger card is of such width as to project beyond the edge of the casing a slight distance to permit it to be held and adjusted longitudinally of the apparatus. A portion of the card also extends across the exposed portion of the panel and is provided with spaces in which any desired remarks about the transaction being made can be entered.

Between each transaction entered in the apparatus, the handle 19 is operated to move the carbon paper and position an unused space on the upper strip in lateral registration with the sight opening 38 for the reception of the next entry. The protector plate may be prevented from resting upon and resisting movement of the carbon paper by providing it with a plurality of small downwardly projecting dimples 24a which will engage the separator plate beyond the confines of the carbon paper.

If desired, the cover may be provided adjacent the writing opening with a channel-shaped holder 39 in which a strip having informative indicia thereon is placed. The indications on this strip register with the columns on the account sheets and notify the inexperienced operators of the proper column for certain type entries.

The longitudinal edges and the edge at the left end of the slot in the separator plate as well as all the edges of the slot in the protector plate are disposed in spaced relation from the edges of the writing opening in the cover 28 to permit the edges of the writing opening to be turned down slightly as indicated in Figs. 3 and 4 where they will engage the account sheet, after it has been properly positioned, and hold it stationary while the entry is being made. The down-turned edges also serve to force the carbon strips down closer to the ledger card and prevent the operator from forcing the pen or pencil point through the papers while writing on the account sheet.

When the account sheet is being inserted in the apparatus prior to making an entry, the cover is held slightly elevated to permit longitudinal adjustment of the sheet. After the proper position has been reached, the cover is completely closed and the account sheet will be tightly held.

To prevent outward movement of the stub shaft 18 while the apparatus is in condition for operation, the side wall 4 adjacent the shaft is provided with a plate 41 which is supported for sliding movement by the rivets 42. The plate is moved in one direction by a spring 43 and in the opposite direction through engagement with the swinging end wall 5 at the rear of the device. When the end wall is closed, the plate will be in the position shown in Fig. 6 and will operate to prevent longitudinal movement of the shaft 18 through the engagement of a shoulder provided thereon at one side of an annular groove 44, with the plate at the sides of the narrow portion of a keyhole-shaped opening 45 shown in dotted lines in Fig. 6.

As the end door at the rear of the device is moved to an open position, the spring 43 will move the plate enough to cause the wide end of the opening 45 to register with the shaft and the latter may then be moved outwardly, in opposition to the force of the spring surrounding it, to release the spool at which time the strips wound thereon may be removed from the machine.

This arrangement serves as an added measure to prevent unauthorized tampering with the apparatus since as long as the rear door is maintained in a closed position, the shaft 18 will be restrained against longitudinal movement.

From Fig. 8, it will be noted that the customer's account sheet is folded to provide two leaves which are identically ruled but are oppositely arranged with regard to the ends of the sheet in order that both leaves may be used for the reception of entries. This feature results in a conservation of paper and thus makes the present system more desirable from an economical standpoint.

While the end doors 5 have been shown and described as being hinged, it is obvious that they could be made rigid and the support box provided with a side door or other suitable closure, if desired.

The operation of the apparatus is as follows, assuming the carbon paper strips have been installed and the apparatus is in condition for operation. A customer approaches the cashier and presents his account sheet with a payment of a sum of money. The cashier takes the account sheet and from the file the ledger card bearing the same account number as the account sheet. The latter is then inserted in the apparatus by raising the cover and placing the leaf to receive the entry on the protector plate. After the cover is partially closed, the account sheet may be moved longitudinally of the apparatus to position the first blank writing space in registration with the writing opening. The ledger card is then slipped into the pocket between the panel and the separator sheet and adjusted longitudinally of the apparatus until the number, previously observed, of the first vacant writing space appears in the sight opening 28. The proper blank spaces on the ledger card and the account sheet are then in registration and the entry can be made.

These entries usually consist of the date, the initials of the cashier or other person making the transaction, a charge or credit, and the balance of the account. As the entry is being made on the account sheet, the first or upper carbon strip will cause an exact copy to be made on the upper surface of the second or lower carbon paper strip and this strip will at the same time cause an exact copy to be transferred to the ledger card. Either before or at the completion of the entry, the cashier will write the account number on the exposed portion of the upper carbon and this also will be transferred to the lower strip. Writing this number adjacent the sight opening serves a twofold purpose in that it provides a check on the cashier and will be an indication as to the position of the strips relative to the slots. If the operator neglects to move the strips after a transaction has been entered, when the next entry is to be made the account number adjacent the sight opening will call the operator's attention to the fact that the carbon paper was not moved. It can then be moved and one entry on top of another avoided.

With the use of this apparatus, only one entry is required to make a complete record. It is, however, possible to use the apparatus in conjunction with any other book or entry sheet as may be desired.

At the end of the day, the owner of the commercial establishment or his agent may unlock the rear end wall, remove the spool or receiver from tis bearings, draw the remaining portion of the strip having entries thereon through the apparatus, and sever the strip by tearing it along a sharp plate 40 provided for the purpose. The ends of the carbon strips remaining in the machine may then be reattached to the spool which is replaced in its bearings and the device is ready for another period of operation.

The portion of the lower strip removed will bear a complete record of all the transactions made with the apparatus. By comparing the totals of the items appearing in each column with the cash, an accurate check can be maintained on the amount of cash received and expended and a balance secured for the time period covered.

The device will be useful in preventing cheating by the employee, it will conserve time and energy by reducing the number of entries to be made, and will provide the owner of the establishment with an accurate record of all the transactions completed.

The apparatus may be modified in a number of different ways. For example, one of the carbon paper strips may be eliminated or replaced with a strip suitably treated to produce a record thereon and transfer a copy of the entry to the card beneath. Other alterations may be made as desired without departing from the spirit and scope of the invention as defined in the following claims.

I claim:

1. Record keeping apparatus comprising a support, a panel secured to said support, a separator plate secured to said support over said panel and spaced therefrom to provide a pocket to loosely receive a ledger card, said plate serving as a support for a plurality of superposed strips of carbon paper, a protector plate secured to the support and extending over said carbon paper, and a cover hinged to said support and normally overlying said protector plate, said protector and separator plates and said cover being provided with elongated registering slots.

2. Record keeping apparatus comprising a support box provided with a panel-like top, a separator plate secured to said box over said panel and spaced therefrom to provide a pocket to slidably receive a ledger card, said panel and plate being provided beyond the ends of said pocket with registering slots, means in said box for rotatably receiving a roll of double carbon paper, the paper from said roll being trained up through one of said slots over said separator plate and down through the other of said slots, means for imparting controlled movement to said paper, a protector plate hinged to said box for swinging movement to a position normally overlying the carbon paper on said separator plate, and a cover hinged to said box and normally overlying said protector plate, said separator and protector plates and said cover being provided with registering elongated slots.

3. Record keeping apparatus comprising a support box provided with a panel-like top and hinged ends, lock means carried by said ends to prevent unauthorized access to the interior of said box, a separator plate secured to said box over said panel and spaced therefrom to provide a pocket to slidably receive a ledger card, said panel and plate being provided beyond the ends of said pocket with registering slots, means in said box for rotatably receiving a roll of double carbon paper, the paper from said roll being trained up through one of said slots over said separator plate and down through the other of said slots, means for imparting controlled movement to said paper, a protector plate hinged to said box for swinging movement to a position normally overlying the carbon paper on said separator plate, and a cover hinged to said box and normally overlying said protector plate, said separator and protector plates and said cover being provided with registering elongated slots.

4. Record keeping apparatus comprising an elongated support box provided with a panel-like top, a separator plate secured to said box over said panel and spaced therefrom to provide a pocket to slidably receive a ledger card, said panel and plate being provided beyond the ends of said pocket with registering slots, means in said box for revolubly receiving a roll of double carbon paper at one end of said box, said paper being trained up through one of said slots over said separator plate and down through the other of said slots, means for imparting controlled movement to said paper, a protector plate hinged to said box for swinging movement to a position normally overlying the carbon paper on said separator plate, and a cover hinged to said box and normally overlying said protector plate, said separator and protector plates and said cover being provided intermediately of their ends with registering elongated transversely extending slots.

5. Record keeping apparatus comprising an elongated support box provided with a panel-like top and hinged ends, lock means carried by said ends to prevent unauthorized access to the interior of said box, a separator plate extending over said panel and spaced therefrom to provide a pocket to slidably receive a ledger card, said panel being provided adjacent each end with a slot, means in said box for revolubly supporting a roll of double impression copy paper, said paper being trained up through one of said slots over said separator plate and back into said box through the other slot, means for imparting controlled movement to said paper, a protector plate pivotally secured to said support for swinging movement about one longitudinal edge of said panel to a position normally overlying the copy paper on said separator plate, said protector plate being secured in its normal position by said box end locking means, and a cover pivotally mounted on said support for swinging movement from a position overlying said protector plate to a position to permit swinging movement of said protector plate, said cover being formed with a slot through which a limited portion of an account sheet resting on said protector plate may be viewed, said protector and separator plates being provided with slots in registration with the slot in said cover.

6. Record keeping apparatus comprising an elongated support box provided with a panel-like top and hinged ends, lock means carried by said ends to prevent unauthorized access to the interior of said box, a separator plate extending over said panel and spaced therefrom to provide a pocket to slidably receive a ledger card, said panel being provided adjacent each end with a slot, means in said box for revolubly supporting a roll of double impression copy paper, said paper being trained up through one of said slots over said separator plate and back into said box through the other slot, means for imparting controlled movement to said paper, a protector plate pivotally secured to said support for swinging movement about one longitudinal edge of said panel to a position normally overlying the copy paper on said separator plate, said protector plate being secured in its normal position by said box end locking means, and a cover pivoted adjacent the longitudinal edge of said panel opposite that near which said protector plate is pivoted, said cover being capable of swinging movement to permit the placing of an account sheet on said protector plate, said cover being formed with a transversely extending slot through which a limited portion of the account sheet may be viewed, said protector and separator plates being formed with similar slots in registration with the slot in said cover.

7. Record keeping apparatus comprising a support, a panel secured to said support, a separator plate extending over said panel and spaced therefrom to provide a pocket for the reception of a ledger card, means carried by said support for holding a supply of carbon paper in strip form, said carbon paper being movable longitudinally over said separator plate, a protector plate normally positioned over the paper on said separator plate, means for preventing unauthorized movement of said protector plate, said separator and protector plates being formed with registering slots extending at an angle to the path of movement of said paper, the opening in said protector plate being of greater length than that in said separator plate.

8. In record keeping apparatus, a panel, a separator plate having a slot-like opening supported above said panel to provide a pocket for the reception of a ledger card having transversely extending indicia-receiving spaces, said pocket being of such size that the card is movable therein to successively register the indicia-receiving spaces with the opening in said plate, means to limit the degree of insertion of said cards into said pocket, said plate serving to support a piece of carbon paper over said pocket, said paper extending over the opening in said plate, a protector plate extending over the carbon paper on said separator plate, said protector plate serving as a support for an account sheet having a plurality of record-receiving spaces, said protector plate having a slot-like opening in registration with the slot in said separator plate and being greater in length than said account sheet to permit movement of said account sheet thereon to successively register the record-receiving spaces with the opening in said plate and the spaces on a ledger card positioned in said pocket, each space on said account sheet being capable of registration with each space on said ledger card.

9. In record keeping apparatus, a panel, a separator plate having a slot-like opening therein supported in spaced relation above said panel to provide a ledger card-receiving pocket which is open only at one side, means for supporting a supply of carbon paper below said panel, said paper being passed over said separator plate and the opening therein, means for moving said paper by the opening in said plate, a protector plate extending over the paper on said separator plate, said protector plate having an opening in registration with that in said separator plate, and a cover member supported for movement into and out of vertical registration with said protector plate, said cover having an opening for registration with the opening in said protector plate, said cover member having flanges around said opening for projection into the openings in said protector and separator plates, when said cover is operatively positioned, said flanges serving to move said carbon paper downwardly into the opening in said separator plate.

10. Record keeping apparatus comprising a support, a panel secured to said support, a separator plate extending over said panel and spaced therefrom to provide a pocket for the reception of a ledger card, said plate serving to support a strip of carbon paper in normally spaced relation from a ledger card positioned in said pocket, and a protector plate secured to the support and extending over said carbon paper, said protector and separator plates being provided with registering elongated openings through which the carbon paper may be engaged with a ledger card in said pocket to impart an impression to said card, said carbon paper being movable over said separator plate at an angle to the longitudinal axes of said openings.

11. Record keeping apparatus comprising a support, a panel secured to said support, a longitudinally extending separator plate positioned on said panel and spaced therefrom to provide a pocket for the reception of a ledger card, the length of said pocket being greater than that of said card, said separator plate being formed to support superposed strips of carbon paper for movement above said pocket and longitudinally with respect thereto, and means for imparting movement to said carbon paper strips, said separator plate being provided with a relatively narrow slot extending at right angles to the length of said pocket, the difference in length between said pocket and card providing for movement of the latter to position various indicia receiving areas thereon in registration with the slot in said separator plate.

12. In record keeping apparatus, a set of at least three plate members positioned in spaced superposed relationship to provide a ledger card-receiving pocket between the lowermost and intermediate plate members and a record paper guide passage between the latter and the upper plate member, the upper and intermediate plate members being formed with registering slot-like openings, said ledger card pocket having a limited width and a length greater than the cards to be positioned therein whereby said cards may be adjusted to register different areas thereon with said slots, means for supporting a supply of record receiving and transmitting strip material adjacent to said set of plate members, means for moving the strip material longitudinally through said guide passage to successively present unused portions thereof to said slots, entries upon said strip at said slots being transmitted by said strip to ledger cards in said pocket, and means for preventing movement of said strip material toward said supply after being used.

13. In record keeping apparatus, a set of at least three plate members positioned in spaced superposed relationship to provide a ledger card-receiving pocket between the lowermost and intermediate plate members and a record paper guide passage between the latter and the upper plate member, the upper and intermediate plate members being formed with registering slot-like openings, said ledger card pocket having a limited width and a length greater than the cards to be positioned therein whereby said cards may be adjusted to register different areas thereon with said slots, means for supporting a supply of record receiving and transmitting strip material adjacent to said set of plate members, means for moving the strip material longitudinally through said guide passage to successively present unused portions thereof to said slots, entries upon said strip at said slots being transmitted by said strip to ledger cards in said pocket, means for preventing movement of said strip material toward said supply after being used, and sharpened means extending transversely relative to said guide passage, said means serving to sever said record strip from the supply after it has passed said slots.

14. In record keeping apparatus, a set of at least three plate members positioned in spaced superposed relationship to provide a ledger card-receiving pocket between the lowermost and intermediate plate members and a record paper guide passage between the latter and the upper plate member, the upper and intermediate plate members being formed with registering slot-like openings, said ledger card pocket having a limited width and a length greater than the cards to be positioned therein whereby said cards may be adjusted to register different areas thereon with said slots, means for supporting a supply of record receiving and transmitting strip material adjacent to said set of plate members, means for moving the strip material longitudinally through said guide passage to successively present unused portions thereof to said slots, entries upon said strip at said slots being transmitted by said strip to ledger cards in said pocket, and gage means disposed adjacent to said slots to facilitate the act of positioning a predetermined area on a ledger card in registration with said slots to receive an impression from said record strip.

15. In record keeping apparatus, a member having an elongated pocket for the reception of a ledger card, strip supporting and guiding means disposed over said pocket and extending longitudinally thereof, said guiding means having a transversely extending slot of limited width to permit direct engagement between a portion of a strip in said guide and a ledger card in said pocket, means for supporting a supply of record receiving and transmitting strip material adjacent to one end of said guide, means for imparting controlled movement to said strip material to successively present unused areas thereof to said slot for engagement with ledger cards disposed in said pocket, said pocket being of such length that the ledger cards positioned therein may be moved to individually register any of a series of indicia-receiving spaces thereon with the slot in said guide whereby said spaces may be engaged by said strip material.

WILLIAM DALE WINDERS.